US011861495B2

(12) United States Patent
Hwangbo et al.

(10) Patent No.: US 11,861,495 B2
(45) Date of Patent: *Jan. 2, 2024

(54) VIDEO SUMMARIZATION USING SEMANTIC INFORMATION

(71) Applicant: Intel Corporation, Santa Clara, CA (US)

(72) Inventors: Myung Hwangbo, Lake Oswego, OR (US); Krishna Kumar Singh, Davis, CA (US); Teahyung Lee, Chandler, AZ (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/201,969

(22) Filed: Mar. 15, 2021

(65) Prior Publication Data

US 2021/0201047 A1 Jul. 1, 2021

Related U.S. Application Data

(63) Continuation of application No. 16/298,549, filed on Mar. 11, 2019, now Pat. No. 10,949,674, which is a
(Continued)

(51) Int. Cl.
*G06V 20/40* (2022.01)
*G06N 3/08* (2023.01)
(Continued)

(52) U.S. Cl.
CPC ............ *G06N 3/08* (2013.01); *G06F 18/2431* (2023.01); *G06N 3/045* (2023.01); *G06V 10/40* (2022.01);
(Continued)

(58) Field of Classification Search
CPC ........ G06V 20/47; G06V 20/49; G06V 10/40; G06V 10/82; G06V 20/41; G06V 10/764
See application file for complete search history.

(56) References Cited

U.S. PATENT DOCUMENTS 6,301,440 B1 10/2001 Bolle et al.
7,000,200 B1 2/2006 Martins
(Continued)

FOREIGN PATENT DOCUMENTS

CA 2820575 1/2014
CN 101673346 3/2010
(Continued)

OTHER PUBLICATIONS

National Intellectual Property Administration of China, "Third Office Action," mailed in connection with Chinese Patent Application No. 201680068783.4, dated Oct. 20, 2020, 11 pages.
(Continued)

*Primary Examiner* — Ian L Lemieux
(74) *Attorney, Agent, or Firm* — Hanley, Flight & Zimmerman, LLC (57) ABSTRACT

Example apparatus disclosed herein are to process a first image of a first video segment from the image capture sensor with a machine learning algorithm to determine a first score for the first image, the machine learning algorithm to detect actions associated with images, the actions associated with labels. Disclosed example apparatus are also to determine a second score for the first video segment based on respective first scores for corresponding images in the first video segment. Disclosed example apparatus are further to determine, based on the second score, whether to retain the first video segment in the memory.

24 Claims, 9 Drawing Sheets

Related U.S. Application Data continuation of application No. 14/998,322, filed on Dec. 24, 2015, now Pat. No. 10,229,324.

(51) Int. Cl.
  *G06V 10/40* (2022.01)
  *G06V 10/82* (2022.01)
  *G06V 10/764* (2022.01)
  *G06F 18/2431* (2023.01)
  *G06N 3/045* (2023.01)

(52) U.S. Cl.
  CPC ............ *G06V 10/764* (2022.01); *G06V 10/82* (2022.01); *G06V 20/41* (2022.01); *G06V 20/47* (2022.01); *G06V 20/49* (2022.01)

(56) References Cited

U.S. PATENT DOCUMENTS

| | | |
|---|---|---|
| 7,676,145 B2 | 3/2010 | Kuberka et al. |
| 8,089,563 B2 | 1/2012 | Girgensohn et al. |
| 8,243,203 B2 | 8/2012 | Suh |
| 8,339,469 B2 | 12/2012 | Vau et al. |
| 8,554,784 B2 | 10/2013 | Nurminen et al. |
| 8,587,670 B2 | 11/2013 | Wood et al. |
| 8,738,553 B1 | 5/2014 | Leung et al. |
| 8,745,250 B2 | 6/2014 | Shah et al. |
| 9,001,215 B2 | 4/2015 | Jung et al. |
| 9,129,158 B1 | 9/2015 | Medasani et al. |
| 9,143,677 B1 | 9/2015 | Anon |
| 9,210,319 B2 | 12/2015 | Rav-Acha et al. |
| 9,600,717 B1* | 3/2017 | Dai ................. G06V 40/20 |
| 9,659,034 B2 | 5/2017 | Lee et al. |
| 10,074,003 B2 | 9/2018 | Xu et al. |
| 10,129,608 B2* | 11/2018 | Han ............. H04N 21/4394 |
| 10,140,517 B2* | 11/2018 | Babenko ........... G06V 20/46 |
| 10,229,324 B2 | 3/2019 | Hwangbo et al. |
| 10,229,326 B2* | 3/2019 | Grundmann ....... G06V 20/47 |
| 10,262,695 B2* | 4/2019 | Newman ............ G11B 27/34 |
| 10,303,984 B2 | 5/2019 | Lee et al. |
| 10,390,082 B2 | 8/2019 | Song et al. |
| 10,402,655 B2* | 9/2019 | Javan Roshtkhari .. G06V 20/48 |
| 10,572,735 B2* | 2/2020 | Han ................. G06V 10/454 |
| 10,582,149 B1* | 3/2020 | Mysore Vijaya Kumar ................ H04N 7/0127 |
| 10,706,701 B2 | 7/2020 | Beiser et al. |
| 10,867,212 B2* | 12/2020 | Kwatra ............. G06F 18/214 |
| 10,873,777 B2* | 12/2020 | Matsunaga ....... H04N 21/4826 |
| 10,949,674 B2 | 3/2021 | Hwangbo et al. |
| 3,041,076 A1 | 10/2021 | Bourdev |
| 2002/0080162 A1 | 6/2002 | Pan et al. |
| 2002/0143972 A1 | 10/2002 | Christopoulos et al. |
| 2004/0101178 A1 | 5/2004 | Fedorovskaya et al. |
| 2004/0125877 A1 | 7/2004 | Chang et al. |
| 2004/0170397 A1 | 9/2004 | Ono |
| 2004/0189863 A1 | 9/2004 | Gu et al. |
| 2004/0208496 A1 | 10/2004 | Pilu |
| 2004/0221322 A1 | 11/2004 | Shen et al. |
| 2005/0012830 A1 | 1/2005 | Pilu |
| 2005/0063566 A1 | 3/2005 | Beek et al. |
| 2005/0208496 A1 | 9/2005 | Ohtani et al. |
| 2006/0020630 A1 | 1/2006 | Stager et al. |
| 2006/0059120 A1 | 3/2006 | Xiong et al. |
| 2006/0103731 A1 | 5/2006 | Pilu et al. |
| 2008/0192129 A1 | 8/2008 | Walker et al. |
| 2008/0292299 A1 | 11/2008 | Kretz et al. |
| 2008/0298571 A1 | 12/2008 | Kurtz et al. |
| 2008/0298796 A1 | 12/2008 | Kuberka et al. |
| 2009/0041312 A1 | 2/2009 | Wakasugi |
| 2009/0063419 A1 | 3/2009 | Nurminen et al. |
| 2009/0089587 A1 | 4/2009 | Brunk et al. |
| 2009/0091443 A1 | 4/2009 | Chen et al. |
| 2009/0180692 A1 | 7/2009 | Sheasby et al. |
| 2010/0165076 A1 | 7/2010 | Vau |
| 2011/0032378 A1 | 2/2011 | Kaneda |
| 2011/0075917 A1 | 3/2011 | Cerosaletti et al. |
| 2011/0182469 A1 | 7/2011 | Ji et al. |
| 2011/0292248 A1 | 12/2011 | de Leon et al. |
| 2012/0033949 A1 | 2/2012 | Lu et al. |
| 2012/0076357 A1* | 3/2012 | Yamamoto ......... H04N 21/8549 382/103 |
| 2012/0081579 A1 | 4/2012 | Doepke |
| 2012/0188382 A1 | 7/2012 | Morrison et al. |
| 2012/0242844 A1 | 9/2012 | Walker et al. |
| 2012/0277914 A1 | 11/2012 | Crow et al. |
| 2012/0300069 A1 | 11/2012 | Sako et al. |
| 2013/0057713 A1 | 3/2013 | Khawand |
| 2013/0114902 A1* | 5/2013 | Sukthankar ....... H04N 21/23418 382/190 |
| 2013/0142435 A1 | 6/2013 | de Leon et al. |
| 2013/0156321 A1* | 6/2013 | Motoi ................ G06V 20/47 382/190 |
| 2013/0195359 A1 | 8/2013 | Yabu |
| 2013/0227456 A1 | 8/2013 | Lee et al. |
| 2013/0259390 A1 | 10/2013 | Dunlop et al. |
| 2013/0286244 A1 | 10/2013 | Tirpak et al. |
| 2014/0055846 A1 | 2/2014 | Wheeler et al. |
| 2014/0078304 A1 | 3/2014 | Othmer |
| 2014/0085495 A1 | 3/2014 | Almalki et al. |
| 2014/0093174 A1* | 4/2014 | Zhang ................ G06F 16/5854 382/190 |
| 2014/0161351 A1 | 6/2014 | Yagnik |
| 2014/0161354 A1 | 6/2014 | Curcio et al. |
| 2014/0189284 A1 | 7/2014 | Hyuseinova et al. |
| 2014/0270482 A1 | 9/2014 | Chakraborty et al. |
| 2014/0341476 A1 | 11/2014 | Kulick et al. |
| 2015/0015735 A1 | 1/2015 | Rav-Acha et al. |
| 2015/0054975 A1 | 2/2015 | Emmett et al. |
| 2015/0370830 A1 | 12/2015 | Murphy-Chutorian et al. |
| 2016/0012270 A1 | 1/2016 | Xu et al. |
| 2016/0070962 A1* | 3/2016 | Shetty ................ G06V 20/46 382/225 |
| 2016/0070963 A1* | 3/2016 | Chakraborty ........ G11B 27/034 386/241 |
| 2016/0080835 A1* | 3/2016 | von Sneidern .... H04N 21/8549 386/282 |
| 2016/0140395 A1 | 5/2016 | Kumar et al. |
| 2016/0292510 A1* | 10/2016 | Han ...................... G11B 27/28 |
| 2016/0350336 A1 | 12/2016 | Checka et al. |
| 2016/0360160 A1 | 12/2016 | Eizenberg |
| 2017/0013191 A1* | 1/2017 | Saad .................. G06V 20/35 |
| 2017/0017857 A1 | 1/2017 | Wolf et al. |
| 2017/0109584 A1 | 4/2017 | Yao et al. |
| 2017/0124400 A1 | 5/2017 | Yehezkel Rohekar et al. |
| 2017/0238055 A1* | 8/2017 | Chang ............... H04N 21/4662 725/19 |
| 2017/0289617 A1* | 10/2017 | Song ................. H04N 21/4666 |
| 2018/0061459 A1 | 3/2018 | Song et al. |
| 2019/0095670 A1 | 3/2019 | Xu et al. |
| 2019/0147279 A1 | 5/2019 | Liu et al. |
| 2019/0213474 A1 | 7/2019 | Lin et al. |
| 2019/0294729 A1 | 9/2019 | Jiang et al. |
| 2019/0303683 A1* | 10/2019 | Pearson ................ G06T 7/60 |
| 2020/0012864 A1 | 1/2020 | Hwangbo et al. |

FOREIGN PATENT DOCUMENTS

| | | |
|---|---|---|
| CN | 101809972 | 8/2010 |
| CN | 102073864 | 5/2011 |
| CN | 102939630 | 2/2013 |
| CN | 103294393 | 9/2013 |
| CN | 103310099 | 9/2013 |
| CN | 103404178 | 11/2013 |
| CN | 103581544 | 2/2014 |
| CN | 103685969 | 3/2014 |
| CN | 104715023 | 6/2015 |
| GB | 2404511 | 2/2005 |
| JP | 2004-356970 | 12/2004 |
| JP | 2007-336098 | 12/2007 |
| JP | 2009-188899 | 8/2009 |

(56) References Cited

FOREIGN PATENT DOCUMENTS

| JP | 2010-016847 | 1/2010 |
|---|---|---|
| JP | 2013-255168 | 12/2013 |

OTHER PUBLICATIONS

National Intellectual Property Administration of China, "Second Office Action," mailed in connection with Chinese Patent Application No. 201680068783.4, dated Jul. 15, 2020, 23 pages.
Butko et al., "Visual Saliency Model for Robot Cameras," IEEE, 2008, 6 pages.
Guo et al., "Spatio-temporal Saliency Detection using Phase Spectrum of Quaternion Fourier Transform," IEEE, Cvpr, 2008, 8 pages.
Hicks, "Making Photo Tagging Easier," Facebook, Jun. 30, 2011, 5 pages. Retrieved from http://www.facebook.com/notes/facebook/making-photo-tagging-easier/467145887130.
Ljungblad, "Passive Photography from a Creative Perspective: 'If I would just shoot the same thing for seven days, it's like . . . What's the point?'" Chi 2009—Art Craetion, Boston, MA, Apr. 7, 2009, pp. 829-838.
Stefanoski et al., "Automatic View Synthesis by Image-Domain-Warping," IEEE Transactions on Image Processing, vol. 22, No. 9, Sep. 2013, pp. 3329-3341.
Chu et al., "Video Co-summarization: Video Summarization by Visual Co-occurance," IEEE, CVPR, 2015, 9 pages.
Rohrbach et al., "Script Data for Attribute-Based Recognition of Composite Activities," European Conference on Computer Vision, Oct. 2012, 14 pages.
Fast et al., "Augur: Mining Human Behaviors from Fiction to Power Interactive Systems," CHI Conference on Human Factors in Computing Systems, May 2016, 11 pages.
Karpathy et al., "Large-scale Video Classification with Convolutional Neural Networks," IEEE Conference on Computer Vision and Pattern Recognition, 2014, 8 pages.
International Searching Authority, "International Search Report," mailed in connection with International Patent Application No. PCT/US2016/058078, dated Jan. 25, 2017, 3 pages.
International Searching Authority, "Written Opinion," mailed in connection with International Patent Application No. PCT/US2016/058078, dated Jan. 25, 2017, 9 pages.
United States Patent and Trademark Office, "Notice of Allowance," mailed in connection with U.S. Appl. No. 14/998,322, dated Oct. 18, 2018, 10 pages.
United States Patent and Trademark Office, "Non-final Office Action," mailed in connection with U.S. Appl. No. 14/998,322, dated Apr. 20, 2018, 31 pages.
United States Patent and Trademark Office, "Final Office Action," mailed in connection with U.S. Appl. No. 14/998,322, dated Sep. 27, 2017, 32 pages.
United States Patent and Trademark Office, "Non-final Office Action," mailed in connection with U.S. Appl. No. 14/998,322, dated May 15, 2017, 29 pages.
National Intellectual Property Administration of China, "Office Action," mailed in connection with Chinese Patent Application No. 201680068783.4, dated Dec. 4, 2019, 11 pages.
United States Patent and Trademark Office, "Notice of Allowance," mailed in connection with U.S. Appl. No. 16/298,549, dated Nov. 12, 2020, 12 pages.
United States Patent and Trademark Office, "Notice of Allowance," mailed in connection with U.S. Appl. No. 16/298,549, dated Jul. 20, 2020, 12 pages.
National Intellectual Property Administration of China, "4th Office Action," mailed in connection with Chinese Patent Application No. 201680068783.4, dated Feb. 19, 2021, 15 pages.
State Intellectual Property Office "Notification of Grant", issued in Chinese Application No. 201680068783.4, dated May 20, 2021, 5 pages.

* cited by examiner

VIDEO SUMMARIZATION USING SEMANTIC INFORMATION

RELATED APPLICATIONS

This patent arises from a continuation of U.S. patent application Ser. No. 16/298,549, which is titled "VIDEO SUMMARIZATION USING SEMANTIC INFORMATION," and which was filed on Mar. 11, 2019, which is a continuation of U.S. patent application Ser. No. 14/998,322, which is titled "VIDEO SUMMARIZATION USING SEMANTIC INFORMATION," and which was filed on Dec. 24, 2015. Priority to U.S. patent application Ser. No. 16/298,549 and U.S. patent application Ser. No. 14/998,322 is claimed. U.S. patent application Ser. No. 16/298,549 and U.S. patent application Ser. No. 14/998,322 are hereby incorporated herein by reference in their respective entireties.

BACKGROUND ART

Electronic devices typically include image capture mechanisms capable of capturing images, still shots, and video data. Electronic devices include, but are not limited to, mobile and wearable devices. Video data can be easily captured and shared for a variety of purposes. Video data is typically recorded and saved locally or shared online. Due to ease of capture, users can save and share a large number of videos. However, users are unwillingly to spend time and effort in going through the large amount of videos to locate a specific video or moment they want to watch or share. Additionally, the video data can consume a large amount of storage space.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Video summarization is a computer vision system that automatically finds representative and salient moments in a video. It enables users to quickly browse a large collection of videos by seeing highlights and summaries. Also it helps save storage and communication bandwidth by keeping only informative sections. The summary will consist of a set of key frames or sub-scenes that would succinctly convey an overall storyline of the whole video.

Previously many existing video summarization solutions were bounded to using low-level features such as color histogram or optical flow. This content-agnostic approach could not capture semantically meaningful moments when building a summary and worked only for limited cases where professional editing is assumed like movies and TV news. Also their applications were confined to videos of a single event or situation.

Embodiments described herein determines high-level semantic contexts (e.g. activities, objects, locations, and people) residing in a video and produces content-aware summary with an importance scoring mechanism from the semantic contexts. Instead of relying on hand-crafted features, convolutional neural networks are used that extracts data-driven features from millions of images. This deep feature is more invariant to erratic camera motion, illumination change and scene clutter that happen severely in long hour or unedited videos captured by normal users.

Figure 1:
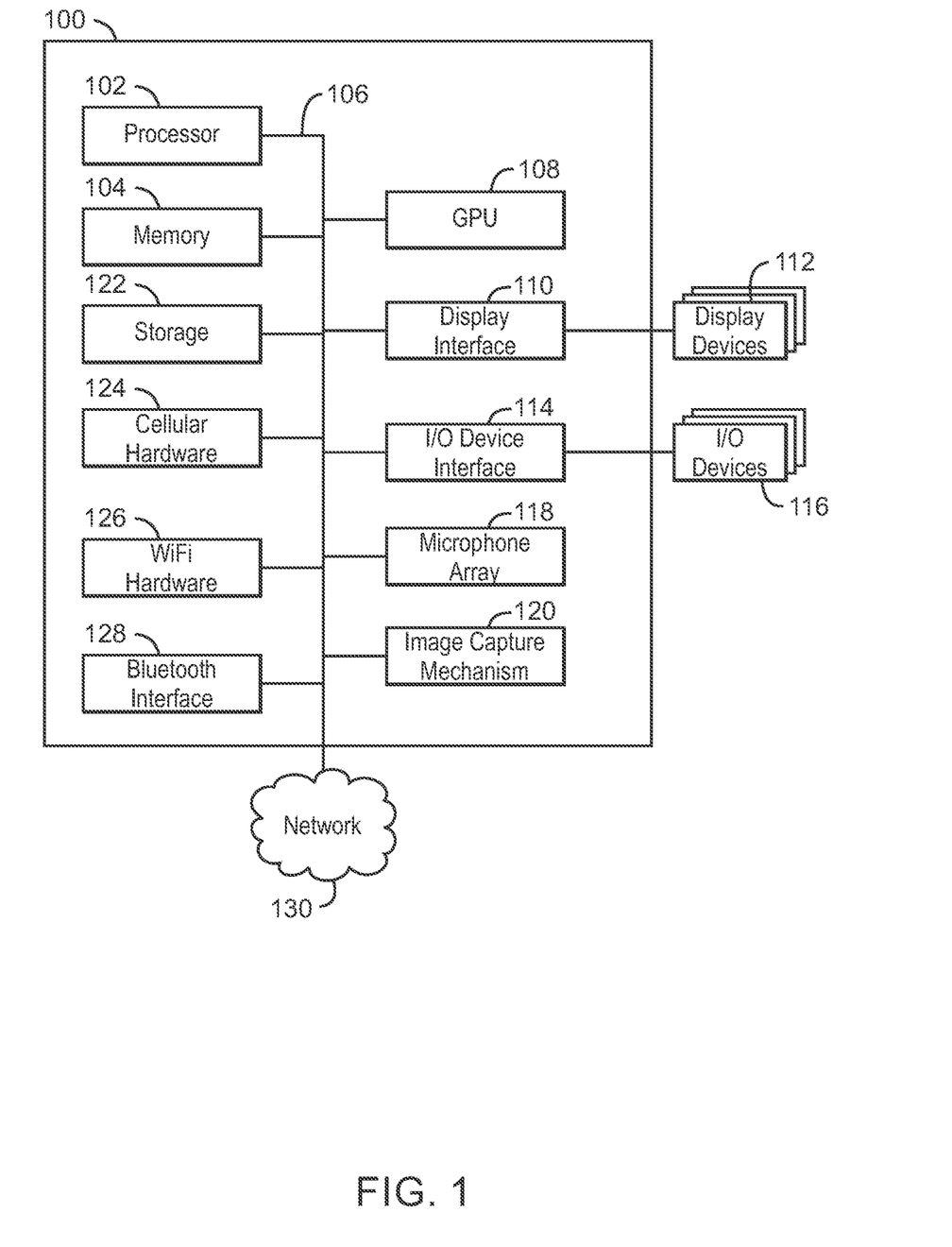
FIG. 1 is a block diagram of an electronic device that enables video summarization using semantic information.

FIG. 1 is a block diagram of an electronic device that enables video summarization using semantic information. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to a display device 122. The display device 122 can include a display screen that is a built-in component of the electronic device 100. The display device 122 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

Accordingly, the electronic device 100 also includes a microphone array 118 for capturing audio. The microphone array 118 can include any number of microphones, including two, three, four, five microphones or more. In some embodiments, the microphone array 118 can be used together with an image capture mechanism 120 to capture synchronized audio/video data, which may be stored to a storage device 122 as audio/video files.

The storage device 122 is a physical memory such as a hard drive, an optical drive, a flash drive, an array of drives, or any combinations thereof. The storage device 122 can store user data, such as audio files, video files, audio/video files, and picture files, among others. The storage device 122 can also store programming code such as device drivers, software applications, operating systems, and the like. The programming code stored to the storage device 122 may be executed by the CPU 102, GPU 108, or any other processors that may be included in the electronic device 100.

High-level contents in a video and their correlation can lead to a more semantically meaningful summary. Video from the GPU or storage 122 can be summarized in a context aware fashion. A context-aware video summary can be generated from unedited videos captured by wearable and mobile devices. High-level semantic entities may be extracted, such as activities, objects and places from a video by using deep network like CNN (Convolutional Neural Network). A scoring mechanism may be implemented that evaluates an importance level of each scene based on the correlation between semantic entities (e.g. co-occurrence between activities and objects).

The CPU 102 may be linked through the bus 106 to cellular hardware 124. The cellular hardware 124 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 126 without being tethered or paired to another device, where the network 130 is a cellular network.

The CPU 102 may also be linked through the bus 106 to WiFi hardware 126. The WiFi hardware is hardware according to WiFi standards (standards promulgated as Institute of Electrical and Electronics Engineers' (IEEE) 802.11 standards). The WiFi hardware 126 enables the wearable electronic device 100 to connect to the Internet using the Transmission Control Protocol and the Internet Protocol (TCP/IP), where the network 130 is the Internet. Accordingly, the wearable electronic device 100 can enable end-to-end connectivity with the Internet by addressing, routing, transmitting, and receiving data according to the TCP/IP protocol without the use of another device. Additionally, a Bluetooth Interface 128 may be coupled to the CPU 102 through the bus 106. The Bluetooth Interface 128 is an interface according to Bluetooth networks (based on the Bluetooth standard promulgated by the Bluetooth Special Interest Group). The Bluetooth Interface 128 enables the wearable electronic device 100 to be paired with other Bluetooth enabled devices through a personal area network (PAN). Accordingly, the network 130 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
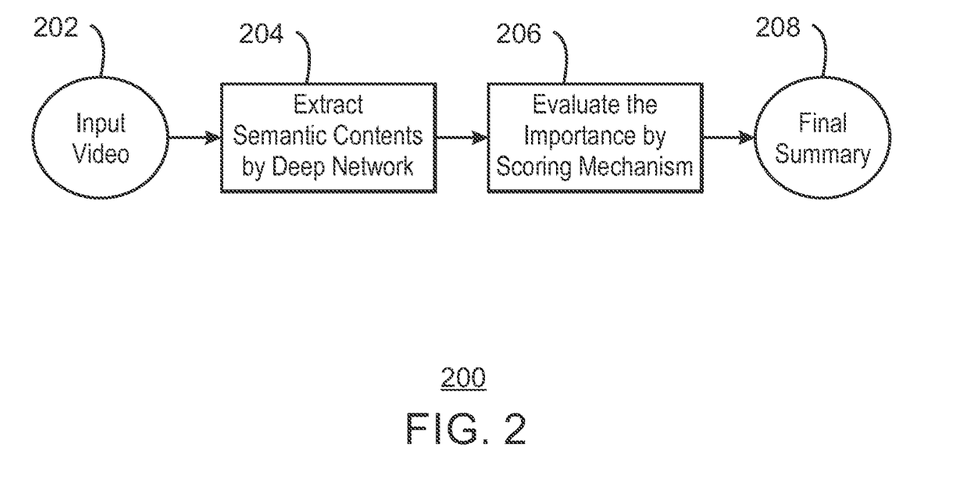
FIG. 2 is an overview of video summarization using semantic information.

FIG. 2 is an overview of video summarization using semantic information. At block 202, an input video is obtained. The input video can be video being currently captured by an image capture mechanism or store or saved videos. Additionally, the input video can be a movie or a television show. At block 204, the content of the input video can be extracted using a deep network. A deep network, as used herein, may be the result of a deep learning architecture that includes algorithms with many layers that can be used for feature extraction and transformation. Deep networks include a convolutional neural network (CNN) that is a feed-forward artificial neural network with individual neurons tiled in a manner that response to overlapping regions in the visual field. For example, a convolutional neural network can consist of multiple layers of small neuron collections which can analyze each frame of the input video. The results of these collections are then tiled so that they overlap to obtain a better representation of the activity or objects present in the video data. This tiling can be repeated for every such layer of the convolutional neural network.

At block 206, the importance of each frame, according to an analysis of the semantic contents of each frame, is evaluated in connection with a scoring mechanism. Semantic contents, as used herein, refers to the meaning associated with contents of each frame. The importance associated with the semantic contents of each frame may be scored differently based on a relationship between the various semantic contents found in each frame. At block 208, a final summary is generated. The final summary can answer the following questions when key frames or key sub-scenes are presented to a user, such as: what series of activities does the original video contain; how many different locations or places the video was taken at; and what objects are important and who appears in the video? The final summary may be based on an importance score of each video clip above a particular threshold. In this manner, the resulting video summary is a context aware video summary through the use of semantic information associated with each video clip.

Typical video summarization solutions are based on low-level features like color or motion cues and they have difficulty in answering these questions about the original video correctly because by nature they are given no clue on what part of videos are semantically representative moments. The present techniques are based on a high-level semantic context and can provide more meaningful answers close to what a user anticipates when watching the whole original video. Furthermore, the correlation between semantic contents enables important aspects across the video to be noted. For example, in a video where "brushing teeth" has been identified as an activity, the resulting summary should consider more frames containing key objects like tooth brushes/pastes as important frames and include them as part of the summary. As used herein, important frames are frames with a high score, as described below. A high score may be high compared to other scores, or it may be a score above a particular threshold.

In the present techniques, the correlation between two semantic contents such as the activity and an object, is leveraged to improve the quality of a video summary. The semantic contents are extracted from the video using deep machine learning techniques like CNN. Deep features trained from millions of images have a more discriminative power and in general show higher classification and detection accuracy than those from previously used hand-crafted features. Adding new semantic information into the summarization would be done more conveniently under the same deep learning architecture.

Additionally, the length and content complexity of an input video according to the present techniques can handle a broader scope of use cases. Existing methods are usually restricted to video inputs containing a short and single event. From the benefit of deep features, which are more insensitive to illumination change, camera motion and scene clutter, a consistent summarization performance is achievable even for long hour videos with multiple events taken by wearable or mobile devices.

Figure 3:
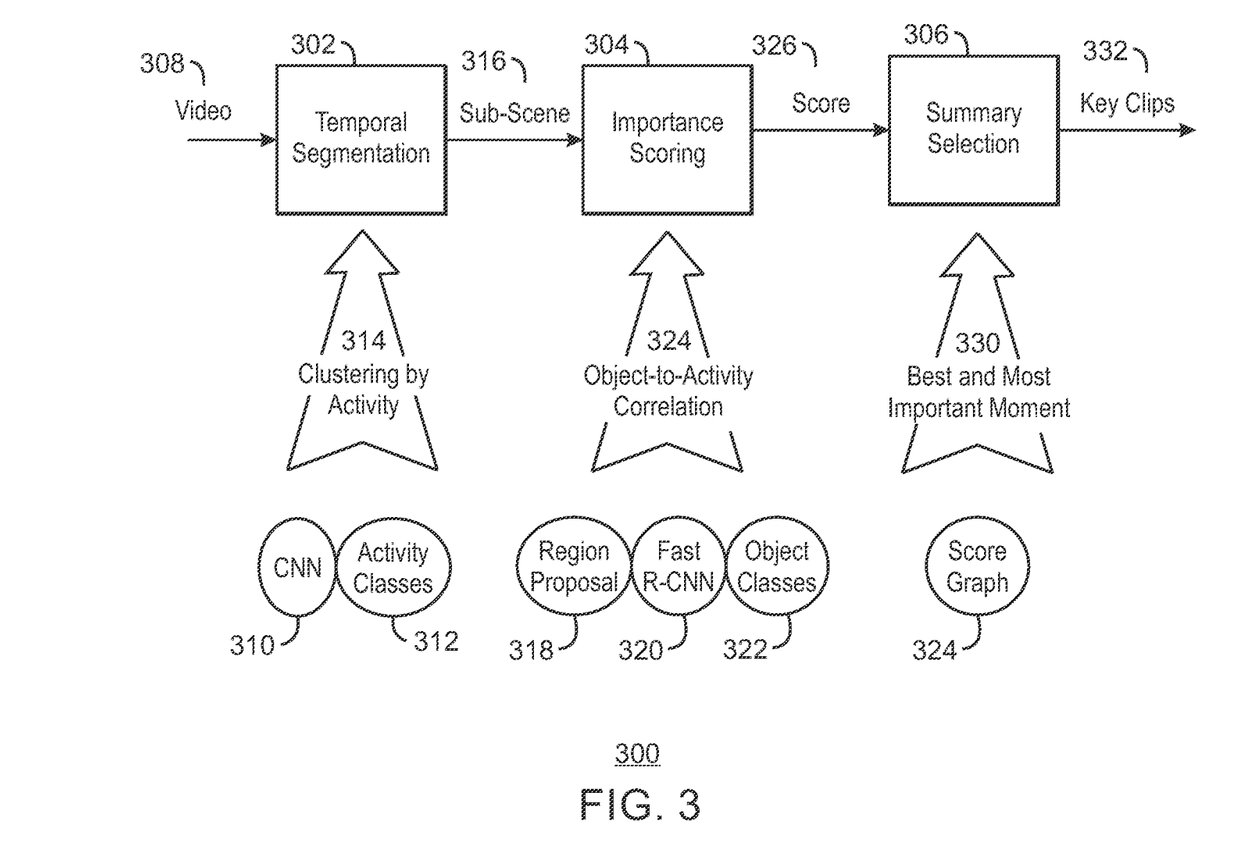
FIG. 3 is an overview of a video summarization pipeline.

FIG. 3 is an overview of a video summarization pipeline 300. The pipeline 300 represents a content-aware video summarization technique that generates a set of key frames or abstracted clips from a given video through the analysis of semantic visual contents. It involves deep machine learning techniques as discussed above that provide activity classification and object detection. Types of input videos are not only movies or TV films which are professionally edited, but also unedited or unstructured ones taken by wearable or mobile devices.

FIG. 3 illustrates three main modules comprising a summarization method: temporal segmentation 302, importance scoring 304, and summary selection 306. The temporal segmentation 302 module detects shot boundaries from activity transition and divides the input video into a set of sub-scenes, where each sub-scene includes one or more activity segments. In embodiments, the shot boundary is an obvious transition between various settings of the video. For example, a shot boundary may be a transition from one room to another in a video. In each activity segment the importance scoring module 304 detects visual objects and evaluates a score for each image frame weighted by an object-to-activity co-occurrence. Finally the summary selection module 306 chooses a high score region that would be the most important and salient moment within that activity segment. A region is a specific area in the image. Then a set of the summarized key clips from every sub-scene are collected and displayed for users.

In particular, temporal segmentation 302 divides an input video 308 into sub-scenes that includes semantically different activities. A convolution neural network (CNN) 310 can be used for activity classification. For example, the CNN may be trained for 20 daily indoor/outdoor activities, such as brushing teeth, watching TV, using computer, eating food, making food, laundry, and etc. To find temporal segments each frame is first classified into one of the activity classes 312 by an activity classifier via the CNN 310. Once all the frames in the input video are classified, activity labels are temporally smoothened using the mode filter in order to prune misclassified labels. Each activity segment consists of continuous frames with the same activity in a minimum time. The segments shorter than a certain threshold are removed and adjacent segments belonging to the same activity are joined. Thus, the segments can be clustered by activity as indicated by arrow 314.

Once the video is divided into activity segments, best moments from each segment are selected according to a scoring function. Thus, the classified sub-scenes 316 are sent to the importance scoring module 304. For a given activity segment A, the following two scoring mechanisms may be applied. An activity based score is calculated as follows:

$$S1 = \text{ProbAct}(f_i, A)$$

where ProbAct( ) is a classification probability returned by the activity classifier. The score S1 and classification probability is a degree of belief that an image frame $f_i$ at the time i belongs to activity class A. The second score is an activity-to-object co-occurrence based score:

$$S2 = \sum_i \text{ProbObj}(O_i) \text{Concurrence}(O_i, A)$$

where $\text{ProbObj}(O_i)$ is a probability returned by the object detector, which means that an object $O_i$ belongs to its labelled class. The Concurrence $(O_i, A)$ represents how important is an object is for a particular activity. The score S2 gives a higher score to a frame containing more important objects which are highly correlated with a labelled activity of the segment. The co-occurrence is computed by what fraction of frames of activity A have an object $O_i$ in the frames.

The importance of an object $O_i$ for an activity A is directly proportional to the value of Concurrence $(O_i, A)$ as follows:

$$\text{Concurrence}(O_i, A) = \frac{F(O_i, A)}{F(A)}$$

where $F(O_i, A)$ is the number of frames in activity A that contains an object $O_i$ and $F(A)$ is the total number of frames for activity A.

The co-occurrence is learned from the object and activity labels of training data. Labels can be obtained by running both activity classifier and object detector on the training data or by human annotation. For example, Table 1 shows the first two most co-occurring objects with given activities, which is used in our experiment.

TABLE 1

| Activity | Object #1 | Object #2 |
|---|---|---|
| Wash face | Tap | Soap |
| Laundry | Washer/dry | Container |
| Watching TV | TV | Door |
| Reading/writing | Book | Laptop |
| Eating food | Dish | Mug/cup |

Accordingly, a region proposal is made at reference number 318. A CNN is then used to classify the objects in each region of the frame. A fast, regional CNN 320 may be used to learn the objects in each region of the frame. The regional CNN 320 results in object classes 322. The object classes 322 and the activity classes 312 may be used in the equations above, and an object to activity correlation may be found as indicated at arrow 324.

The scores 326 resulting from the equations above and the object to activity correlation as indicated at arrow 324 are sent to the summary selection module 306. The summary selection module 306 generates a final summary of the most important frames or highlights of the video clips 332. The final summary can be generated in various ways by inspecting the importance score distribution or a score graph 328. For example, a set of key image frames, each of which corresponds to the highest score for each activity segment may be selected as indicated by arrow 330. In another example, a set of key clips each of which corresponds to an N-second of each action segment that shows the highest score sum can be selected for the final summary. In embodiments, N can be chosen arbitrarily, such as five or ten second depending on a user's preference or storage constraint.

In embodiments, the activity classifier and object detector used are each CNN-based deep networks. The CNN-based deep networks are pre-trained by millions of images from database for hundreds of different labels, and then fine-tuned for use with video summarization, including a modified set of labels and additional training datasets. A dataset may be, for example, millions of frames of dozens of people performing unscripted, everyday activities.

Consider, for example, a dataset consisting of 20 videos collected by different individuals capturing their everyday activities at their own homes. Along with videos human annotations for activities and object classes are provided for ground truth. In evaluation 15 videos are used for training and the remaining 5 are for testing.

Figure 4:
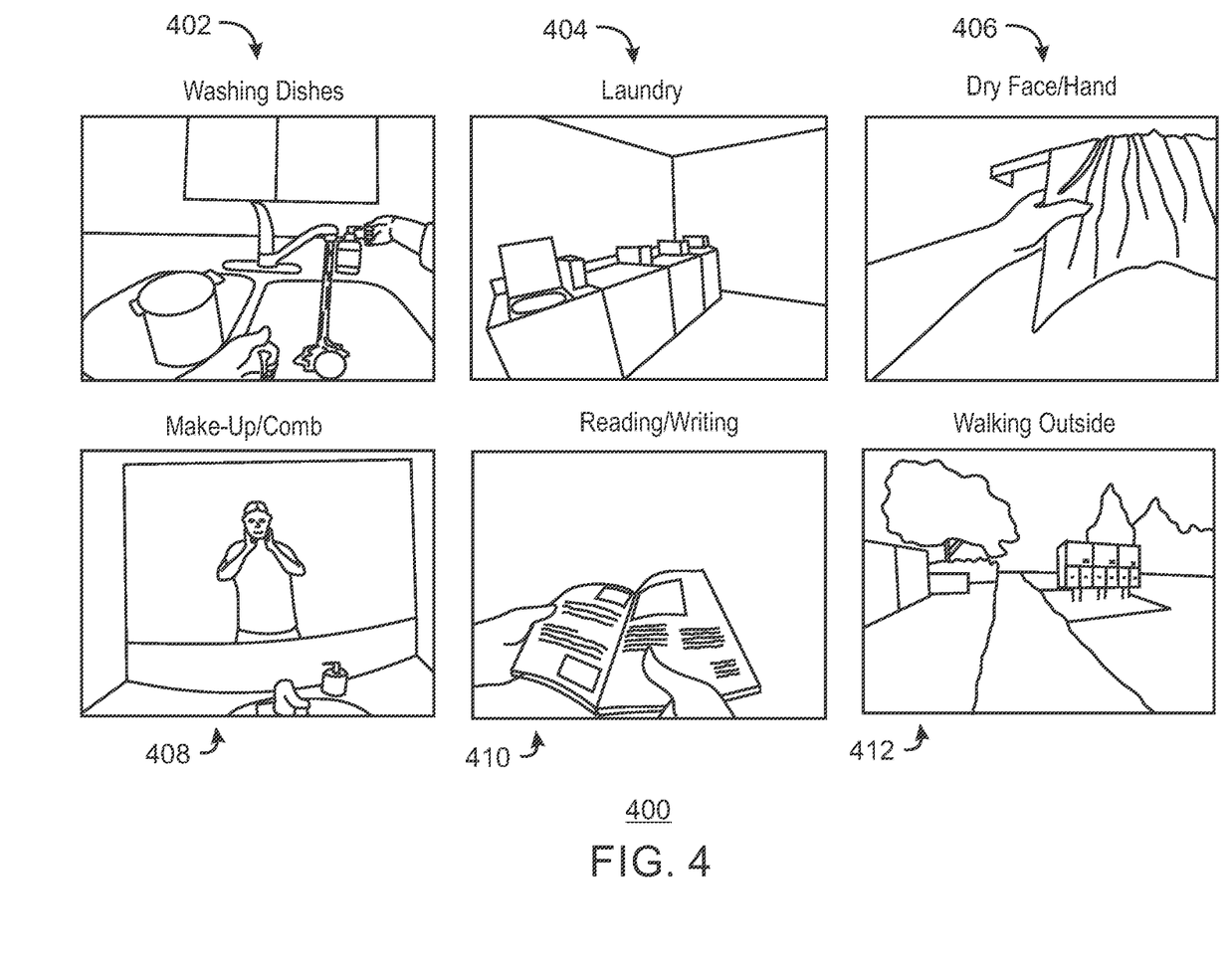
FIG. 4 is an illustration of the qualitative result of the CNN activity classifier.

FIG. 4 is an illustration of the qualitative result 400 of the CNN activity classifier. Six frames are illustrated with the resulting activity class. Although six frames are illustrated, any number of frames may be used. For each frame, the activity classes are washing dishes 402, laundry 404, dry face/hand 406, makeup/comb 408, reading/writing 410, and walking outside 412. Activity classification as described above may be performed using a CNN-based deep network that is trained for classifying 20 activities using the human annotations. The activity classification yields a 55.1% accuracy in frame-by-frame testing. The weights of the network can be initialized by a pre-trained network like MIT Places Hybrid-CNN (which trained by 2.3 million images for 1183 object/scene classes). The weights may be defined as the coefficient numbers of each node in the CNN network.

The temporal segmentation module uses the following 20 activity labels for segmenting the input video by activity shown in FIG. 4: Make-up/comb, Brush teeth, Wash face/hand, Dry face/hand, Laundry, Adjust thermostat, Wash dishes, Make tea/coffee, Drink water-bottle, Make food, Eat food, Mop kitchen, Vacuum, Take pills, Watch TV, Use computer, Use cell, Reading/writing, Drink coffee, Walk outside. The accuracy number of 55.1% is good considering that most of these activity classes are very similar to each other. Additionally, twenty activity labels are used in FIG. 4 as an example, and any number of activity labels can be used according to the present techniques.

After the activities have been classified, object detection is performed. As discussed above, a fast-RCNN may be used for object detection. The fast-RCNN may take a CNN pre-trained with an image database organized according to the WordNet hierarchy, in which each node of the hierarchy is depicted by hundreds and thousands of images. The fast-RCNN then fine-tunes the network on a visual object class detection data. The fast-RCNN may be additionally trained for more object classes using the annotation as provided.

Figure 5:
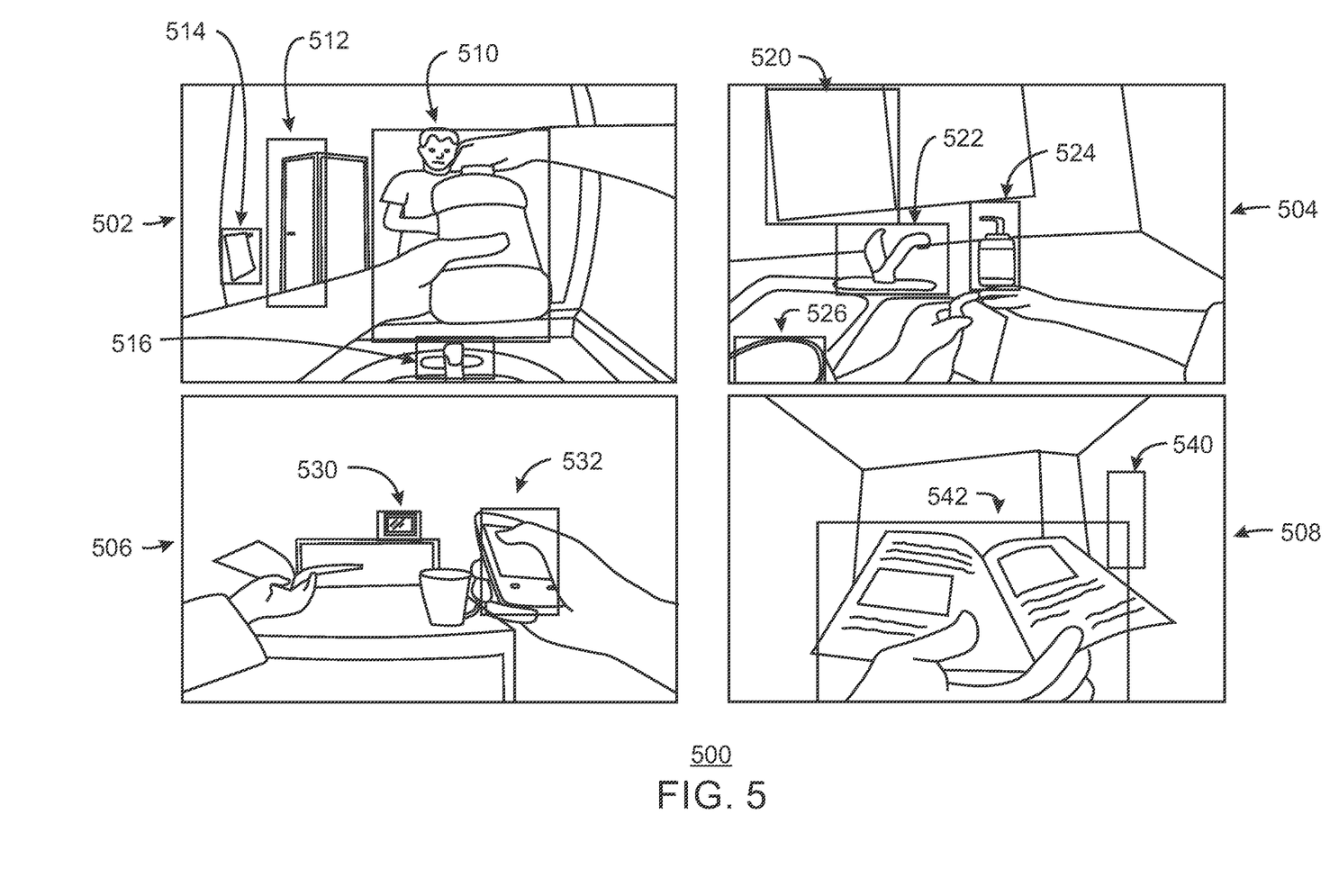
FIG. 5 is an illustration of bounding boxes with detection probability for object classification.

FIG. 5 is an illustration of bounding boxes with detection probability for object classification. FIG. 5 includes frame 502, frame 504, frame 506, and frame 508. Frame 502 includes and a person 510, a door 512, a towel 514, and a tap 516. Frame 504 includes a window 520, a tap 522, soap/liquid 524, and a cup 526. Frame 506 includes a television 530 and a cell phone 532. Frame 508 includes a door 540 and a book 542. Each detected object within the frame includes a bounding boxes with a detection probability in test images by Fast-RCNN.

Figure 6A:
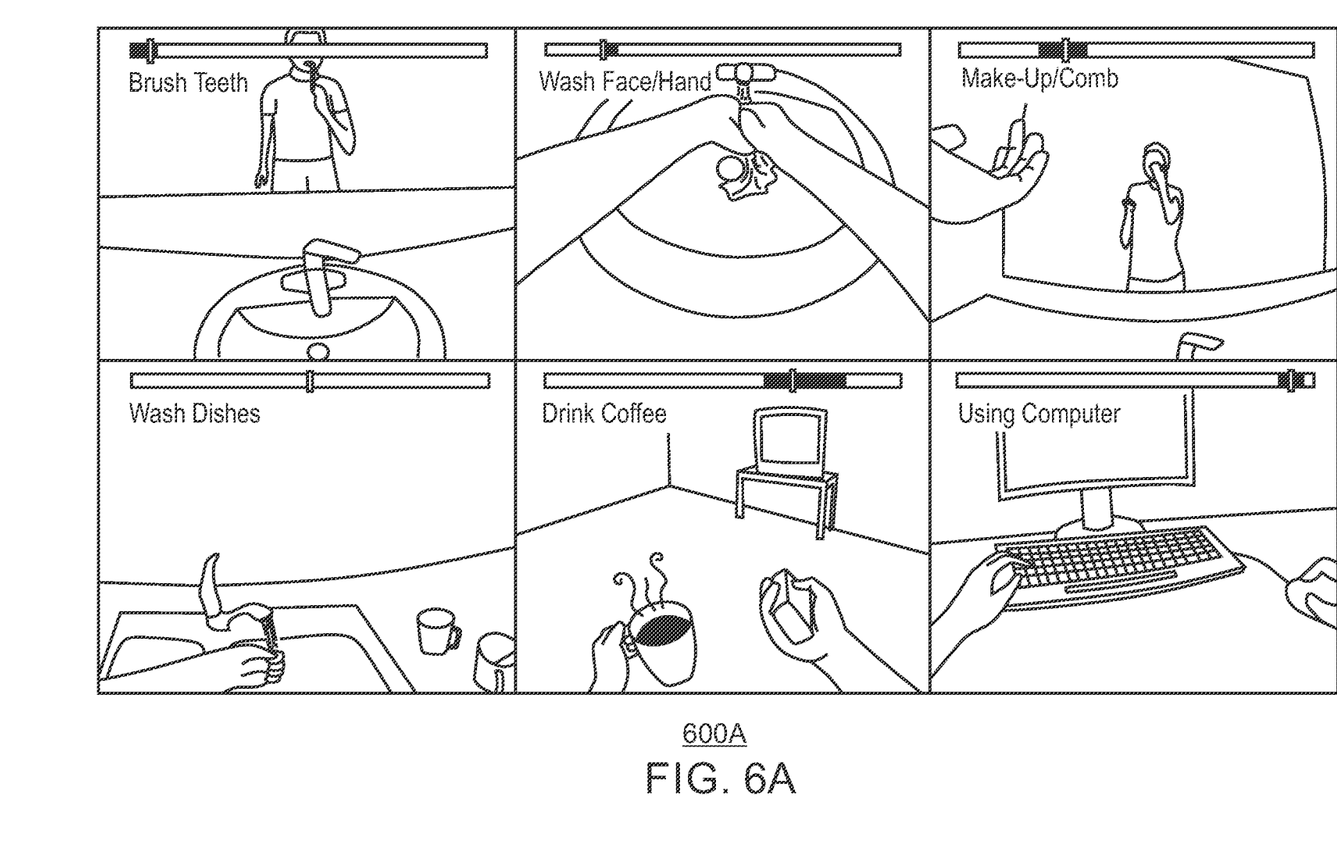
FIGS. 6A and 6B illustrate a video summary.
Figure 6B:
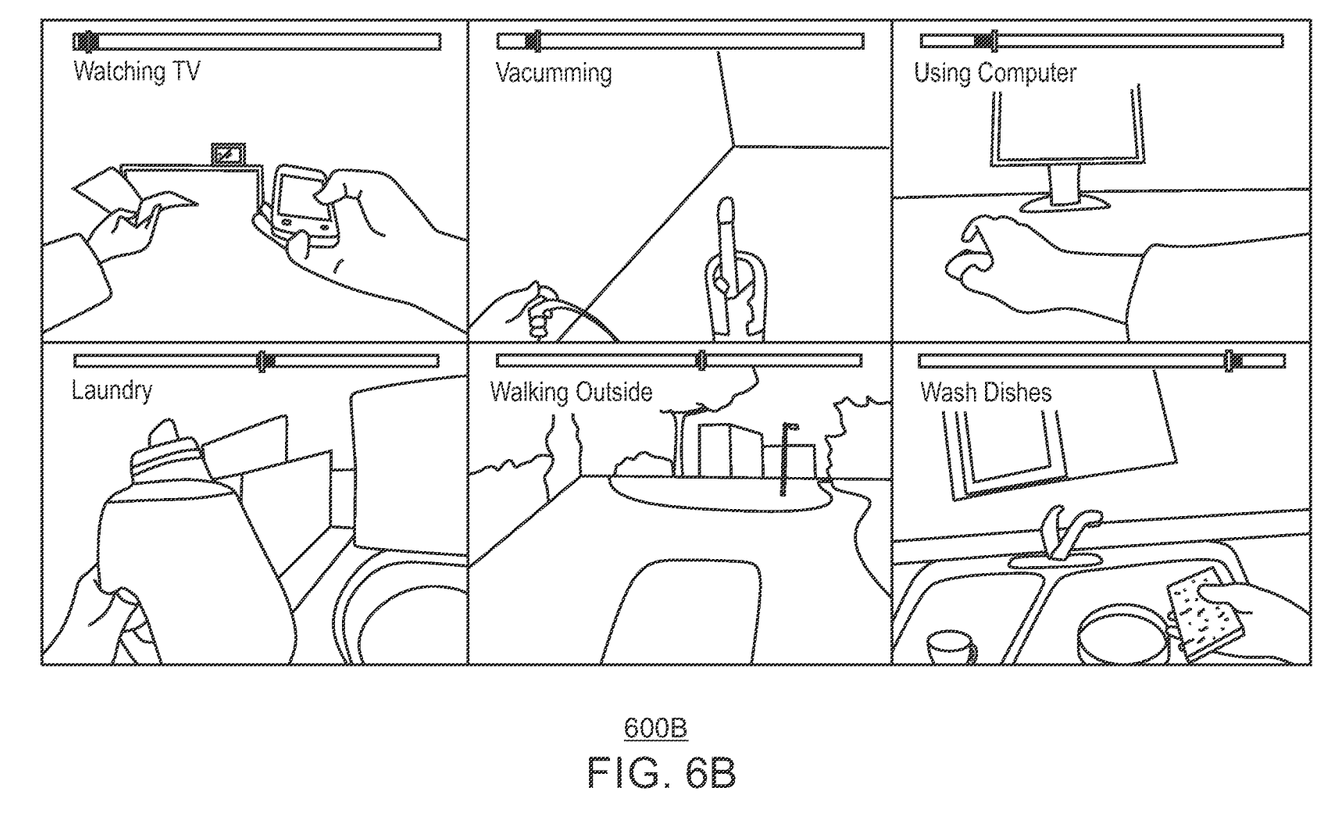

A video summary may be created by selecting the best five continuous seconds based on the S2 score (activity-to-object co-occurrence based scoring) from six activity segments. The same activity is prevented from being repeated in the summary and longer activities are preferably included in the summary. To visualize the summary, best moments of each activity segment is displayed in a grid layout in FIGS. 6A and 6B. In these figures a bar 602 represents an entire duration of the video input and the cross-hatched portion 604 blue bar represents time period of the activity segment. The solid portion 606 indicates the moment of the highest importance score shown in the grid. The location of the solid portion 606 was decided according to the scoring mechanism S2. The summarized outputs show the capability of our algorithm to capture meaningful moments of important activities. When compared with naïve uniform sampling, many important activities in the video are missed. In content-unaware methods like the uniform sampling, one drawback is that certain activities taking a very long duration may dominate the summary.

Figure 7:
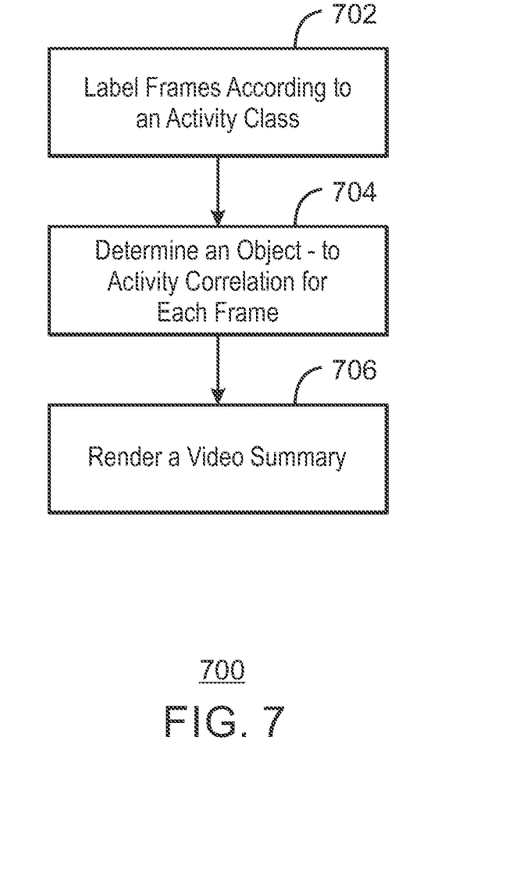
FIG. 7 is a process flow diagram of a method for video summarization with semantic information.

FIG. 7 is a process flow diagram of a method for video summarization with semantic information. At block 702, each frame of a plurality of frames may be labeled according to an activity class. In embodiments, the plurality of frames is segmented into sub-scenes. At block 704, an object-to-activity correlation for each frame is determined. In embodiments, the object-to-activity correlation results in one or more scores that indicate the likelihood that an object is related to the particular activity class for the frame. At block 706, a video summary is rendered. The video includes the frames with the highest object-to-activity correlation for each frame in sub-scene or a shot boundary.

Figure 8:
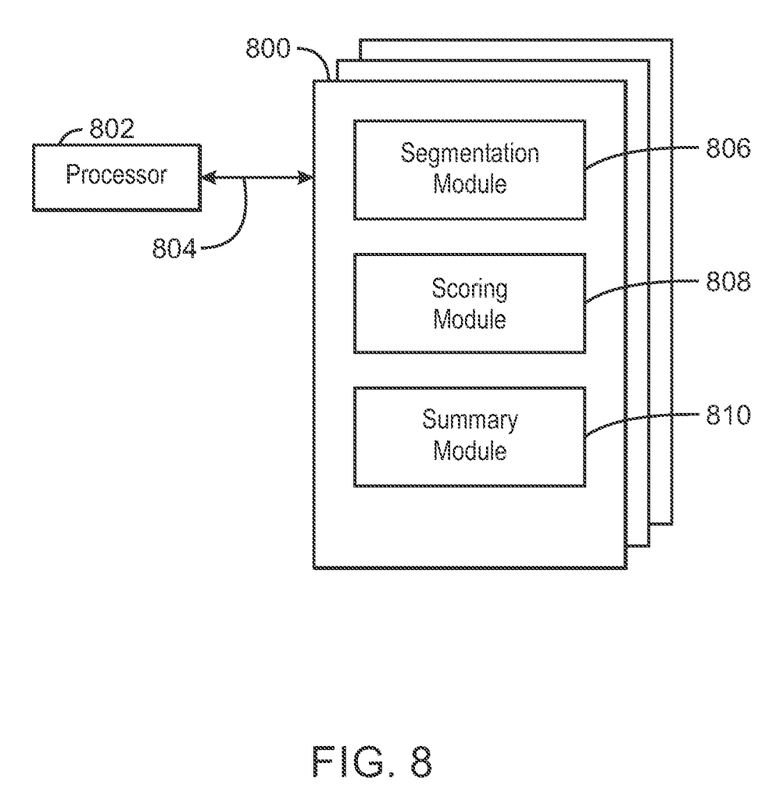
FIG. 8 is a block diagram showing a medium that contains logic for video summarization.

FIG. 8 is a block diagram showing a medium 800 that contains logic for video summarization. The medium 800 may be a computer-readable medium, including a non-transitory medium that stores code that can be accessed by a processor 802 over a computer bus 804. For example, the computer-readable medium 800 can be volatile or non-volatile data storage device. The medium 800 can also be a logic unit, such as an Application Specific Integrated Circuit (ASIC), a Field Programmable Gate Array (FPGA), or an arrangement of logic gates implemented in one or more integrated circuits, for example.

The medium 800 may include modules 808-810 configured to perform the techniques described herein. For example, a segmentation module 806 may be configured segment the frames into video data and apply an activity class to the segments. A scoring module 808 may be configured to generate one or more scores based on an object-to-activity correlation. A summary module 810 may be configured to render frames with the highest object-to-activity correlation in a video summary.

The block diagram of FIG. 8 is not intended to indicate that the medium 800 is to include all of the components shown in FIG. 8. Further, the medium 800 may include any number of additional components not shown in FIG. 8, depending on the details of the specific implementation.

Example 1 is an apparatus. The apparatus includes a controller to segment an incoming video stream into a plurality of activity segments, wherein each frame is associated with an activity; a scoring mechanism to calculate a score for each frame of each activity, wherein the score is based, at least partially, on a classification probability of each frame; and a summarizer to summarize the activity segments based on the score for each frame.

Example 2 includes the apparatus of example 1, including or excluding optional features. In this example, the score is based on, at least partially, an activity-to-object co-occurrence.

Example 3 includes the apparatus of any one of examples 1 to 2, including or excluding optional features. In this example, the activities are segmented by one or more shot boundaries and each frame is labeled according to an activity class.

Example 4 includes the apparatus of any one of examples 1 to 3, including or excluding optional features. In this example, a convolutional neural network is used to classify each segment into an activity. Optionally, frames with mislabeled activities are relabeled according to the activities of surrounding frames.

Example 5 includes the apparatus of any one of examples 1 to 4, including or excluding optional features. In this example, a fast, regional convolutional neural network is used to classify a plurality of objects of each frame.

Example 6 includes the apparatus of any one of examples 1 to 5, including or excluding optional features. In this example, segments lower than a predefined threshold in length are discarded.

Example 7 includes the apparatus of any one of examples 1 to 6, including or excluding optional features. In this example, the scoring mechanism determines a score that is the probability that a frame belongs to an activity based on objects in the frame.

Example 8 includes the apparatus of any one of examples 1 to 7, including or excluding optional features. In this example, the scoring mechanism determines a score that is the probability that an object of a frame belongs to a class of objects combined with the importance of the object for the activity assigned to the frame.

Example 9 includes the apparatus of any one of examples 1 to 8, including or excluding optional features. In this example, the summarizer is to create a summary by adding frames to the summary with scores above a predefined threshold.

Example 10 includes the apparatus of any one of examples 1 to 9, including or excluding optional features. In this example, the summary is generated by selecting key image frames that correspond to the highest score for each segment, or key clips of N-seconds are selected for each segment.

Example 11 is a method for video summarization. The method includes labeling each frame of a plurality of frames according to an activity class; determining an object-to-activity correlation for an object within each frame; and rendering a video summary that comprises the frames with object-to-activity correlations above a predetermined threshold for each frame in a shot boundary.

Example 12 includes the method of example 11, including or excluding optional features. In this example, object to activity correlation is obtained by executing both an activity classifier and object detector on a set of training data, by human annotation, or by any combination thereof.

Example 13 includes the method of examples 11 or 12, including or excluding optional features. In this example, the importance of an object for an activity is directly proportional to the value of the number of frames in activity that contains an object divided by the total number of frames for that activity.

Example 14 includes the method of any one of examples 11 to 13, including or excluding optional features. In this example, a convolutional neural network is used to label each frame according to an activity class.

Example 15 includes the method of any one of examples 11 to 14, including or excluding optional features. In this example, a fast, regional convolutional neural network is used to classify a plurality of objects of each frame.

Example 16 includes the method of any one of examples 11 to 15, including or excluding optional features. In this example, a probability than the object belongs to a particular activity is used to determine, at least partially, the object to activity correlation.

Example 17 includes the method of any one of examples 11 to 16, including or excluding optional features. In this example, a scoring mechanism determines a score that is the probability that a frame belongs to an activity based on objects in the frame that is used to determine, at least partially, the object to activity correlation.

Example 18 includes the method of any one of examples 11 to 17, including or excluding optional features. In this example, a scoring mechanism determines a score that is the probability that an object of a frame belongs to a class of objects combine with the importance of the object for the activity assigned to the frame, that is used to determine, at least partially, the object to activity correlation.

Example 19 includes the method of any one of examples 11 to 18, including or excluding optional features. In this example, the video summary is rendered by creating a summary by adding frames to the summary with an object-to-activity correlation above a predefined threshold.

Example 20 includes the method of any one of examples 11 to 19, including or excluding optional features. In this example, the video summary is generated by selecting key image frames that correspond to the highest an object-to-activity correlation.

Example 21 is a system. The system includes a display; an image capture mechanism; a memory that is to store instructions and that is communicatively coupled to the image capture mechanism and the display; and a processor communicatively coupled to the image capture mechanism, the display, and the memory, wherein when the processor is to execute the instructions, the processor is to: label each frame of a plurality of frames according to an activity class; determine a score corresponding to each frame; and render a video summary that comprises the frames with scores above a predetermined threshold for each frame in a shot boundary.

Example 22 includes the system of example 21, including or excluding optional features. In this example, the score is based on, at least partially, an activity-to-object co-occurrence of an object within each frame.

Example 23 includes the system of any one of examples 21 to 22, including or excluding optional features. In this example, the score is based on, at least partially, a classification probability of each frame.

Example 24 includes the system of any one of examples 21 to 23, including or excluding optional features. In this example, a convolutional neural network is used to label each frame of the plurality of frames according to an activity class.

Example 25 includes the system of any one of examples 21 to 24, including or excluding optional features. In this example, frames with mislabeled activity classes are relabeled according to the activities of surrounding frames.

Example 26 includes the system of any one of examples 21 to 25, including or excluding optional features. In this example, a fast, regional convolutional neural network is used to classify a plurality of objects of each frame.

Example 27 includes the system of any one of examples 21 to 26, including or excluding optional features. In this example, frames with scores lower than the predetermined threshold are discarded.

Example 28 includes the system of any one of examples 21 to 27, including or excluding optional features. In this example, the score is a probability that an object of a frame belongs to a class of objects combined with the importance of the object for the activity assigned to the frame.

Example 29 is a tangible, non-transitory, computer-readable medium. The computer-readable medium includes instructions that direct the processor to label each frame of a plurality of frames according to an activity class; determine an object-to-activity correlation for an object within each frame; and render a video summary that comprises the frames with object-to-activity correlations above a predetermined threshold for each frame in a shot boundary.

Example 30 includes the computer-readable medium of example 29, including or excluding optional features. In this example, object to activity correlation is obtained by executing both an activity classifier and object detector on a set of training data, by human annotation, or by any combination thereof.

Example 31 includes the computer-readable medium of any one of examples 29 to 30, including or excluding optional features. In this example, the importance of an object for an activity is directly proportional to the value of the number of frames in activity that contains an object divided by the total number of frames for that activity.

Example 32 includes the computer-readable medium of any one of examples 29 to 31, including or excluding optional features. In this example, a convolutional neural network is used to label each frame according to an activity class.

Example 33 includes the computer-readable medium of any one of examples 29 to 32, including or excluding optional features. In this example, a fast, regional convolutional neural network is used to classify a plurality of objects of each frame.

Example 34 includes the computer-readable medium of any one of examples 29 to 33, including or excluding optional features. In this example, a probability than the object belongs to a particular activity is used to determine, at least partially, the object to activity correlation.

Example 35 includes the computer-readable medium of any one of examples 29 to 34, including or excluding optional features. In this example, a scoring mechanism determines a score that is the probability that a frame belongs to an activity based on objects in the frame that is used to determine, at least partially, the object to activity correlation.

Example 36 includes the computer-readable medium of any one of examples 29 to 35, including or excluding optional features. In this example, a scoring mechanism determines a score that is the probability that an object of a frame belongs to a class of objects combine with the importance of the object for the activity assigned to the frame, that is used to determine, at least partially, the object to activity correlation.

Example 37 includes the computer-readable medium of any one of examples 29 to 36, including or excluding optional features. In this example, the video summary is rendered by creating a summary by adding frames to the summary with an object-to-activity correlation above a predefined threshold.

Example 38 includes the computer-readable medium of any one of examples 29 to 37, including or excluding optional features. In this example, the video summary is generated by selecting key image frames that correspond to the highest an object-to-activity correlation.

Example 39 is an apparatus. The apparatus includes instructions that direct the processor to a controller to segment an incoming video stream into a plurality of activity segments, wherein each frame is associated with an activity; a means to calculate a score for each frame; and a summarizer to summarize the activity segments based on the score for each frame.

Example 40 includes the apparatus of example 39, including or excluding optional features. In this example, the score is based on, at least partially, an activity-to-object co-occurrence.

Example 41 includes the apparatus of any one of examples 39 to 40, including or excluding optional features. In this example, the score is based on, at least partially, a classification probability of each frame.

Example 42 includes the apparatus of any one of examples 39 to 41, including or excluding optional features. In this example, the activities are segmented by one or more shot boundaries and each frame is labeled according to an activity class.

Example 43 includes the apparatus of any one of examples 39 to 42, including or excluding optional features. In this example, a convolutional neural network is used to classify each segment into an activity. Optionally, frames with mislabeled activities are relabeled according to the activities of surrounding frames.

Example 44 includes the apparatus of any one of examples 39 to 43, including or excluding optional features. In this example, a fast, regional convolutional neural network is used to classify a plurality of objects of each frame.

Example 45 includes the apparatus of any one of examples 39 to 44, including or excluding optional features. In this example, segments lower than a predefined threshold in length are discarded.

Example 46 includes the apparatus of any one of examples 39 to 45, including or excluding optional features. In this example, the means to calculate a score for each frame determines a score that is the probability that a frame belongs to an activity based on objects in the frame.

Example 47 includes the apparatus of any one of examples 39 to 46, including or excluding optional features. In this example, the means to calculate a score for each frame determines a score that is the probability that an object of a frame belongs to a class of objects combined with the importance of the object for the activity assigned to the frame.

Example 48 includes the apparatus of any one of examples 39 to 47, including or excluding optional features. In this example, the summarizer is to create a summary by adding frames to the summary with scores above a predefined threshold.

Example 49 includes the apparatus of any one of examples 39 to 48, including or excluding optional features. In this example, the summary is generated by selecting key image frames that correspond to the highest score for each segment, or key clips of N-seconds are selected for each segment.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An electronic device comprising:
an image capture sensor;
memory to store video segments;
wireless communication circuitry; and
one or more processors to:
process a first image of a first video segment from the image capture sensor with a machine learning algorithm, the machine learning algorithm to process the first image to output a first score for the first image, the machine learning algorithm trained to detect actions associated with frames of image data input to the machine learning algorithm, the actions associated with labels;
determine a second score for the first video segment from respective first scores output by the machine learning algorithm for corresponding images in the first video segment; and
at least one of retain the first video segment in the memory or discard the first video segment from the memory based on the second score.

2. The electronic device of claim 1, wherein the machine learning algorithm is to output a confidence that the first image is associated with a first one of the labels.

3. The electronic device of claim 1, wherein the first video segment has a duration of at least five seconds.

4. The electronic device of claim 1, wherein the labels correspond to a group of labels having a size of at least hundreds of labels.

5. The electronic device of claim 1, wherein the electronic device is a wearable device.

6. The electronic device of claim 1, wherein the wireless communication circuitry includes at least one of WiFi hardware, Bluetooth hardware or cellular hardware.

7. The electronic device of claim 1, wherein the machine learning algorithm is implemented with a convolutional neural network trained to detect the actions associated with the images.

8. The electronic device of claim 1, further including:
a display;
a microphone; and
at least one of a keyboard, a touchpad or a touchscreen.

9. At least one memory device comprising computer readable instructions that, when executed, cause an electronic device to at least:
process a first image of a first video segment from an image capture sensor of the electronic device with a machine learning algorithm, the machine learning algorithm to process the first image to output a first score for the first image, the machine learning algorithm trained to detect an action associated with at least one frame of image data input to the machine learning algorithm, the action associated with a label;
determine a second score for the first video segment from respective first scores output by the machine learning algorithm for corresponding images in the first video segment; and
at least one of retain the first video segment in the electronic device or discard the first video segment from the electronic device based on the second score.

10. The at least one memory device of claim 9, wherein the machine learning algorithm is to output a confidence that the first image is associated with the label.

11. The at least one memory device of claim 9, wherein the first video segment has a duration of at least five seconds.

12. The at least one memory device of claim 9, wherein the label is one of a group of labels having a size of at least hundreds of labels.

13. The at least one memory device of claim 9, wherein the machine learning algorithm is implemented with a convolutional neural network trained to detect the action.

14. An electronic device comprising:
  means for capturing images;
  means for storing video segments; and
  means for determining whether to retain a first video segment, the means for determining to:
    process a first image of the first video segment with a machine learning algorithm, the machine learning algorithm to process the first image to output a first score for the first image, the machine learning algorithm trained to detect actions associated with frames of image data input to the machine learning algorithm, the actions associated with labels;
    determine a second score for the first video segment from respective first scores output by the machine learning algorithm for corresponding images in the first video segment; and
    at least one of retain the first video segment or discard the first video segment based on the second score.

15. The electronic device of claim 14, wherein the machine learning algorithm is to output a confidence that the first image is associated with a first one of the labels.

16. The electronic device of claim 14, wherein the first video segment has a duration of at least five seconds.

17. The electronic device of claim 14, wherein the labels correspond to a group of labels having a size of at least hundreds of labels.

18. The electronic device of claim 14, further including means for transmitting data via a WiFi network.

19. The electronic device of claim 14, wherein the machine learning algorithm is implemented with a convolutional neural network trained to detect the actions associated with the images.

20. A method comprising:
  processing, by executing an instruction with processor circuitry of an electronic device, a first image of a first video segment with a machine learning algorithm, the machine learning algorithm to process the first image to output a first score for the first image, the machine learning algorithm trained to detect actions associated with frames of image data input to the machine learning algorithm, the actions associated with labels, the first video segment from an image capture sensor of the electronic device;
  determining, by executing an instruction with the processor circuitry, a second score for the first video segment based on respective first scores for corresponding images in the first video segment; and
  at least one of retaining the first video segment in the electronic device or discarding the first video segment from the electronic device based on the second score.

21. The method of claim 20, wherein the machine learning algorithm is to output a confidence that the first image is associated with a first one of the labels.

22. The method of claim 20, wherein the first video segment has a duration of at least five seconds.

23. The method of claim 20, wherein the labels correspond to a group of labels having a size of at least hundreds of labels.

24. The method of claim 20, wherein the machine learning algorithm is implemented with a convolutional neural network trained to detect the actions associated with the images.

* * * * *